United States Patent [19]

Takahashi et al.

[11] Patent Number: 4,981,828
[45] Date of Patent: Jan. 1, 1991

[54] CATALYST FOR HYDROTREATMENT OF HYDROCARBONS AND METHOD FOR PRODUCTION THEREOF

[76] Inventors: Yasuhito Takahashi, Narashino City, Chiba Prefecture; Shigeru Sakai, Ichikawa City, Chiba Prefecture, both of Japan

[21] Appl. No.: 442,448

[22] Filed: Nov. 28, 1989

Related U.S. Application Data

[63] Continuation-in-part of Ser. No. 214,397, Jul. 1, 1988, abandoned.

[51] Int. Cl.$^5$ .................. B01J 31/34; B01J 31/28
[52] U.S. Cl. .................. 502/168; 502/210; 502/211; 502/213; 502/219; 502/220; 502/221; 502/222
[58] Field of Search ............... 502/168, 210, 211, 213, 502/219, 220, 221, 222

[56] References Cited

U.S. PATENT DOCUMENTS

| | | | |
|---|---|---|---|
| 3,972,829 | 8/1976 | Michalko | 502/168 X |
| 4,588,706 | 5/1986 | Kukes et al. | 502/210 X |
| 4,636,487 | 1/1987 | Parrott et al. | 502/220 X |
| 4,725,569 | 2/1988 | Tuszynski et al. | 502/168 |

Primary Examiner—Patrick P. Garvin
Attorney, Agent, or Firm—Watson, Cole, Grindle & Watson

[57] ABSTRACT

A catalyst for the hydrotreatment of a hydrocarbon oil comprises a carrier of an inorganic oxide and an active component supported on the carrier and formed of at least one member selected from the group consisting of water-soluble compounds of molybdenum, tungsten, and the metal of Group 8 in the Periodic Table of Elements and at least one mercapto (—SH) group-containing organic compound selected from the group consisting a mercaptocarboxylic acids represented by the general formula:

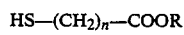

(wherein n stands for an integer in the range of 1 to 3 and R for a hydrogen atom, an alkali metal, an alkaline earth metal, ammonium, or a linear or branched naphthenic alkyl group having 1 to 10 carbon atoms), amino-substituted mercaptans represented by the general formula:

(wherein R' stands for a divalent hydrocarbon group), divalent mercaptans represented by the general formula:

(wherein R' stands for a divalent hydrocarbon group), and thio acids represented by the general formula:

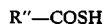

(wherein R" stands for a monovalent hydrocarbon group).

18 Claims, No Drawings

CATALYST FOR HYDROTREATMENT OF HYDROCARBONS AND METHOD FOR PRODUCTION THEREOF

CROSS REFERENCE TO RELATED APPLICATION

The present application is a continuation-in-part of application Ser. No. 214,397, filed Jul. 1, 1988, now abandoned.

BACKGROUND OF THE INVENTION

1. Field of the Invention

This invention relates to an easily activable catalyst for, hydrotreatment of a hydrocarbon oil and to a method for the production thereof.

2. Description of the Prior Art

In the so-called hydrotreatment which consists in effecting hydrogenation, hydro-desulfurization, hydrodenitrification, hydrogenolysis, etc. of a hydrocarbon oil in the presence of hydrogen, the catalyst which has at least one metal from among the metals of Group 6 and the metals of Group 8 in the Periodic Table of Elements supported as an active ingredient for hydrotrentment on a carrier of such an inorganic oxide as alumina, silica-alumina, or titania is used. Mo and W are preferred choices among the metals of Group 6 and Co and Ni among these of Group 8.

The metal for this purpose is generally supported in the form of an oxide. Since the metal in this form possesses no activity, it must be subjected to presulfiding, i.e. activation by the conversion of the oxide form into the sulfide form, before it is put to use in the hydrotreatment.

It has been customary to effect the presulfiding by charging the catalyst in a reactor to be used for the hydrotreatment of a hydrocarbon oil and then passing a sulfiding agent in combination with hydrogen through the bed of catalyst. The operating conditions for the presulfiding are widely varied by the process of the hydrotreatment to be employed or by the kind of the sulfiding agent to be used. Where hydrogen sulfide is used as a sulfiding agent, for example, the presulfiding is effected by diluting this sulfiding agent with hydrogen to a concentration roughly in the range of 0.5 to 5% by volume and passing the resultant mixture in a total volume of 1,000 to 3,000 liters as computed under standard temperature and pressure per liter of the catalyst at a temperature not lower than 180° C. (generally not lower than 250° C.). Where carbon disulfide, normal butyl mercaptan, dimethyl sulfide, dimethyl disulfide, or the like is used as a sulfiding agent, it is put to use as diluted with a more volatile hydrocarbon oil, with the temperature in the range of 250° to 350° C., the pressure in the range of 20 to 100 kg/cm$^2$, the space velocity of the liquid mixture in the range of 0.5 to 2 hr$^{-1}$, and the hydrogen/oil ratio in the range of 200 to 1,000 N-liters/liter.

After this presulfiding operation is completed, the material being fed to the reactor is switched from the diluted sulfiding agent to the hydrocarbon oil as an actual raw material for treatment, to initiate the operation of the hydrotreatment.

Incidentally, since this operation of presulfiding predetermines the success or failure of the subsequent hydrotreatment, proper selection of raw materials to be used and deliberate execution of the procedure to be adopted are indispensable requirements. In the use of a diluent, for example, if the diluent happens to contain an olefin, the presulfiding possibly polymerizes the olefin and the produced polymer poisons the catalyst. The hydrocarbon oil to be used as a diluent, therefore, must be of a type not containing any olefin. A less volatile hydrocarbon oil is not suitable as a diluent because it possesses too high viscosity to manifest a desired effect in wetting the surface of the catalyst. Thus, there is no alternative but to use a more volatile oil. The use of such a more volatile oil entails an increase in cost. The catalytic metal has the possibility of being inactivated when it is suffered to react with hydrogen at elevated temperatures and consequently undergo reduction. To preclude this inactivation, the sulfiding agent must be used rather generously. The proportions of the sulfiding agent and hydrogen must be properly maintained. Generally, the presulfiding of the nature described above is carried out over a period of several days. Since this operation by nature is performed temporarily, it is not automated in most cases. Since the operation inevitably involves extraordinary complicated steps, the operator is compelled to endure a heavy burden. In the circumstances, the obviation of the necessity for this presulfiding or at least the alleviation of the complicacy of the operation has constituted itself a task.

Recently, a method which can fulfil this task has been proposed.

This method comprises impregnating a catalyst formed of a deposited active metal with a polysulfide represented by the general formula, R—S(n)—R' (wherein n stands for an integer in the range of 3 to 20 and R and R' independently stand for a hydrogen atom or an organic group having 1 to 150 carbon atoms per molecule) and heat-treating the impregnated catalyst in the absence of hydrogen gas at a temperature in the range of 65° to 275° C. under a pressure in the range of 0.5 to 70 bars (Japanese Patent Application Disclosure SHO No. 61(1986)-111,144). In accordance with this method, since the polysulfide which has impregnated the catalyst is caused by the subsequent heat treatment to sulfide the active metal, the presulfiding to be performed in the reactor has no use for the sulfiding agent or the diluent and, therefore, can be effected with an easy operation. The presulfiding, when desired, may be performed outside the reactor. In this case, the catalyst which has undergone the presulfiding is ready to be packed in the reactor and put to use immediately in initiating the hydrotreatment.

The amount of the aforementioned polysulfide to be used is a stoichiometric amount necessary for subsequent thorough sulfiding of the whole active metal oxide (such as, for example, NiO or MoO$_3$) present in the catalyst. This polysulfide is diluted with a suitable organic solvent and, as such, caused to impregnate the catalyst. In impregnating a catalyst which has a large loaded active metal content, therefore, the aofrementioned polysulfide solution to be used must be in a high concentration. Since the polysulfide mentioned above has a high visosity, the possibility ensures that the compound, when used in the form of a solution of high concentration, penetrates small pores of the catalyst with difficulty.

SUMMARY OF THE INVENTION

It is an object of this invention to provide a catalyst which can be used directly for the hydrotreatment of a hydrocarbon more simply and less expensively than the catalyst of conventional method described above and a method for the production of the catalyst.

After various studies devoted to the solution of the problem mentioned above and the achievement of the object described above, the inventors have found that the object is accomplished by using as active metals the water-soluble compounds of molybdenum, tungsten, and the metals of Group 8 in the Periodic Table of Elements and using mercapto (—SH) group-containing organic compounds in the place of polysulfides. This invention has been perfected as the result. The first aspect of this invention consists in a catalyst for the hydrotreatment of a hydrocarbon, having supported on a carrier of an inorganic oxide at least one member selected from the group consisting of the water-soluble compounds of molybdenum, tungsten, and the metals of Group 8 in the Periodic Table of Elements and at least one mercapto (—SH) group-containing organic compound selected from the group consisting of mercaptocarboxylic acids represented by the general formula, HS—$(CH_2)_n$—COOR (n stands for an integer in the range of 1 to 3 and R for a hydrogen atom, an alkali metal, an alkaline earth metal, ammonium, or a linear or branched naphthenic alkyl group having 1 to 10 carbon atoms), amino-substituted mercaptans represented by the general formula, $H_2H$—R'—SH (wherein R' stands for a divalent hydrocarbon group), divalent mercaptans represented by the general formula, HS—R'—SH (wherein R' stands for a divalent hydrocarbon group), and thio acids represented by the general formula, R"—COSH (wherein R" stands for a monovalent hydrocarbon group). The second aspect of this invention consists in a method for the production of a catalyst for the hydrogenation of a hydrocarbon, which comprises impregnating a carrier of an inorganic oxide with an aqueous solution containing at lest one member selected from the group consisting of the water-soluble compounds of molybdenum, tungsten, and the metals of Group 8 in the Periodic Table of Elements, then drying the impregnated carrier, and subsequently impregnating the dried carrier with a solution of at least one mercapto (—SH) group-containing organic compound selected from the group consisting of mercaptocarboxylic acids represented by the general formula, HS—$(CH_2)_n$—COOR (n stands for an integer in the range of 1 to 3 and R for a hydrogen atom, an alkali metal, an alkaline earth metal, ammonium, or a linear or branched naphthenic alkyl group having 1 to 10 carbon atoms), amino-substituted mercaptans represented by the general formula, $H_2N$—R'—SH (wherein R' stands for a divalent hydrocarbon group), divalent mercaptans represented by the general formula, HS—R'—SH (wherein R' stands for a divalent hydrocarbon group), and thio acids represented by the general formula, R"—COSH (wherein R" stands for a monovalent hydrocarbon group). The third aspect of this invention consists in a method for the production of a catalyst for the hydrotreatment of a hydrocarbon, which comprising impregnating a carrier of an inorganic oxide with a solution containing at least one member selected from the group consisting of the water-soluble compounds of molybdenum, tungsten, and the metals of Group 8 in the Periodic Table of Elements and at least one mercapto (—SH) group-containing organic compound selected from the group consisting of mercaptocarboxylic acids represented by the general formula, HS—$(CH_2)_n$—COOR (n stands for an integer in the range of 1 to 3 and R for a hydrogen atom, an alkali metal, an alkaline earth metal, ammonium, or a linear or branched naphthenic alkyl group having 1 to 10 carbon atoms), amino-substituted mercaptans represented by the general formula, $H_2N$—R'—SH (wherein R' stands for a divalent hydrocarbon group), divalent mercaptans represented by the general formula, HS—R'—SH (wherein R' stands for a divalent hydrocarbon group), and thio acids represented by the general formula, R"—COSH (wherein R" stands for a monovalent hydrocarbon group).

DESCRIPTION OF THE PREFERRED EMBODIMENTS

As widely known heretofore, porous alumina, silica-alumina, and titania can be cited as typical inorganic oxide inorganic oxide carriers. Particularly, alumina and silica-alumina are representative of these carriers.

As heretofore known, ammonium molybdate and ammonium tungstate can be cited as desirable examples of water-soluble compounds of Mo and W, as active metals. Among other metals of Group 8 in the Periodic Table of Elements, Co and Ni prove to be particularly desirable. Cobalt nitrate, cobalt carbonate, nickel nitrate, and nickel carbonate can be cited as desirable examples of water-soluble compounds of Co and Ni. These water-soluble compounds may be used either independently or in a mixed form. Molybdenum trioxide and tungsten trioxide may be used as converted with ammonia gas into aqueous solutions of ammonium molybdate and ammonium tungstate respectively. When these water-soluble compounds of active substances are heated in combination with at least one member selected from the group consisting of mercapto-carboxylic acids represented by the general formula, HS—$(CH_2)_n$—COOR, amino-substituted mercaptans represented by the general formula, $H_2N$—R'—SH, divalent mercaptans represented by the general formula, HS—R'—SH, and thio acids represented by the general formula, R"—COSH, (hereinafter referred to collectively as "mercaptocarboxylic acids and other sulfiding agents"), they produce such sulfides as $MoS_2$, $WS_2$, CoS, and NiS which exhibit high activity in the reaction of hydrogenation and hydrodesulfurization.

As active substances, the water-soluble compounds of molybdenum, tungsten, and the metals of Group 8 in the Periodic Table of Elements which are used either independently or in a mixed form may additionally contain phosphorus (P). The impregnation of phosphorus on the carrier may be effected separately of or simultaneously with molybdenum, tungsten, and the metals of Group 8 in the Periodic Table of Elements. In the case of simultaneous impregnation, all the compounds involved are used in the form of a mixed solution. This mixed solution gains in viscosity and consequently in difficulty of permeation in proportion as the phosphorus content thereof increases. The largest allowable amount of phosphorus that can be impregnated in this manner on the catalyst is 8% by weight as $P_2O_5$.

As sulfiding agents, concrete examples of mercaptocarboxylic acids represented by the general formula, HS—$(CH_2)_n$—COOR (wherein n stands for an integer in the range of 1 to 3 and R for a hydrogen atom, an alkali metal, an alkaline earth metal, ammonium, or a linear or branched naphthenic alkyl group of 1 to 10 carbon atoms) include mercaptocarboxylic acids such as mercaptoacetic acid ($HSCH_2COOH$) and mercaptopropionic acid ($HSCH_2CH_2COOH$), alkali metal salts, alkaline earth metal salts, and ammonium salts of such acids, and mercaptocarboxylic esters such as methyl mercaptoacetate ($HSCH_2COOCH_3$), ethyl 2-mercaptoacetate ($HSCH_2COOC_2H_5$), 2-ethylhexyl mercaptoacetate ($HSCH_2COOC_8H_{17}$), and methyl 3-mercaptopropionate ($HSCH_2CH_2COOCH_3$); concrete examples of amino-substituted mercaptans represented by the general formula, $H_2N—R'—SH$ (wherein R' stands for a divalent hydrocarbon group) include 2-aminoethanethiol ($H_2NCH_2CH_2SH$) and 4-aminothiophenol ($H_2NC_6H_4SH$); concrete examples of divalent mercaptans represented by the general formula, $HS—R'—SH$ (wherein R' stands for a divalent hydrocarbon group), include ethanedithiol ($HSCH_2CH_2SH$) and 1,4-butanedithiol ($HS(CH_2)_4SH$); and concrete examples of thio acids represented by the general formula, $R''—COSH$ (wherein R'' stands for a monovalent hydrocarbon group), include thioacetic acid ($CH_2COSH$) and thiobenzoic acid ($C_6H_5COSH$).

The conventional method adopted for the production of a catalyst for the hydrotreatment of a hydrocarbon oil generally comprises impregnating a carrier of an inorganic oxide with a component of a Group 6 metal and/or a component of a Group 8 metal in the Periodic Table of Elements as active metals, drying the impregnated carrier, and subsequently calcining the dried carrier.

The present invention contemplates loading a solution of a mercaptocarboxylic acid or other sulfiding agent by the technique of impregnation on the dried carrier obtained subsequently to the step of impregnation with an aqueous solution of the water-soluble compound of active metal in the conventional procedure mentioned above or loading on the carrier of an inorganic oxide a solution containing a water-soluble compound of active metal and a mercaptocarboxylic acid or other sulfiding agent by the technique of impregnation. These methods of the present invention requires no addition of any new step to the process for production of the catalyst and has no use for the step of calcining which is indispensable to the conventional method and, therefore, prove to be advantageous from the stadpoint of thermal energy. For the solution of the mercaptocarboxylic acid or other sulfiding agent, it is most economical to use water as the solvent. By the same token, it is most economical to use the solution of the water-soluble compound of active metal and the mercaptocarboxylic acid or other sulfiding agent in the form of an aqueous solution.

The amount of the mercaptocarboxylic acid or other sulfiding agent to be used is desired to fall in the range of 1 to 3 equivalent weights, based on the amount of sulfur which is necessary for the formation of a sulfide form of molybdenum, tungsten, or a metal of Group 8 (such as, for example, $MoS_2$, $WS_2$, CoS, or NiS) which exhibits high activity in the reaction of hydrotreatment. If the amount is smaller than the range mentioned above, the produced catalyst is deficient in activity. If the amount is larger than the range, the excess amount proves to be wasteful because it cannot be expected to bring about any appreciable improvement in the activity of the produced catalyst.

The catalyst which has been prepared in accordance with this invention is generally dried to expel the used solvent, then charged in a reaction column, and subsequently put to use in the hydrotreatment of a hydrocarbon oil. Optionally, the expulsion of the used solvent by drying may be effected after the catalyst as produced is charged in the reaction column the drying temperature can be up to 180°.

In the present invention, the catalyst which has been dried need not be given any special treatment but may be immediately used for the hydrotreatment of a hydrocarbon oil.

In the reaction for hydrotreatment of a hydrocarbon oil, the catalyst prepared in accordance with the present invention exhibits a more desirable activity than the catalyst which has been presulfided by the conventional method. Though the reason for the superiority of the activity remains yet to be found, the desirable activity may be logically explained by a supposition that the mercaptocarboxylic acid or other sulfiding agent, or reaction with the water-soluble compound of molybdenum, tungsten, or a Group-8 metal, forms a soluble coordination compound and this coordination compound is supported in a highly dispersed state on the carrier of inorganic oxide.

Now, the present invention will be described more specifically below with reference to working examples and comparative experiments.

EXAMPLE 1

Fifty (50) g of a γ-alumina carrier (having a specific surface area of 320 $m^2/g$ and a pore volume of 0.72 ml/g and intended for use with a catalyst produced by Nippon Ketjen Co., Ltd. and marketed under product code of "KF707") was impregnated with 40 ml of an impregnating liquid (pH 8) prepared from 10.8 g of molybdenum trioxide, 4.1 g of cobalt carbonate (Co content 49.1% by weight), ammonia gas, and water. The impregnated carrier was dried at 110° C. for 16 hours. Then, the dried carrier was wholly impregnated in one test run with 30 ml of an aqueous solution containing 30.3 g of mercaptoacetic acid (d=1.33) and in the other test run with 30 ml of an alcohol solution containing 34.9 g of methyl mercaptoacetate (d=1.19). The resultant impregnated carriers were dried at 110° C. for 16 hours, to obtain Catalysts $A_1$ and $A_2$.

The metal contents of the catalysts, $A_1$ and $A_2$, were 17% by weight of molybdenum as $MoO_3$ and 4% by weight of cobalt as CoO. The amount of mercaptoacetic acid and methyl mercaptoacetate used in the catalysts were each 1.8 times the theoretical amount of sulfur required for conversion of Mo and Co into $MoS_2$ and CoS respectively.

Fifty (50) g of an alumina carrier intended for the same catalyst "KF707" as used above was wholly impregnated with 50 ml of an impregnating liquid (pH 5 in one test run of pH 5.5 in the other test run) prepared from 10.8 g of molybdenum trioxide, 4.1 g of cobalt carbonate, and 21.9 g mercaptoacetic acid in one test run of 25.2 g of methyl mercaptoacetate in the other test run, ammonia gas, and water. The impregnated carriers were dried at 110° C. for 16 hours, to obtain Catalysts $A_3$ and $A_4$.

The metal contents of the catalysts, $A_3$ and $A_4$, were 17% by weight of molybdenum as $MoO_3$ and 4% by weight of cobalt as CoO. The amounts of mercaptoacetic acid and methyl mercaptoacetate used in the catalysts were each 1.3 times the theoretical amount of sulfur required for conversion of Mo and Co into $MoS_2$ and CoS respectively.

The catalysts, $A_1$, $A_2$, $A_3$, and $A_4$, produced as described above were each used in the reaction for hydrodesulfurization of straight-run gas oil distilled from Kuwait crude oil; hereinafter abbreviated as KSRGO.

The attributes of KSRGO used in the reaction were as follows.
  Specific gravity (15°/4° C.): 0.848
  Sulfur content (% by weight): 1.61
  Nitrogen content (ppm): 157
  Distillation property (initial boiling point, °C.): 211
  Distillation property (50 vol %, °C.): 340
  Distillation property (end point, °C.): 406

The reaction was carried out with a flow type reaction vessel under the following reaction conditions.
  Amount of catalyst: 3 ml
  Liquid space velocity of feed oil: 2.0 $hr^{-1}$
  Reaction pressure (hydrogen pressure): 30 $kg/cm^2$
  Reaction temperature: 330° C.
  Hydrogen/oil ratio: 300N-liters/liter
  Reaction time: 8 hrs The oil under treatment was sampled at intervals of two hours and assayed for sulfur content to determine the ratio of hydro-desulfurization. The average of rate of hydro-desulfurization calculated from the sulfur contents of the samples of treated oil taken at the 4th, 6th, and 8th hours along the course of reaction is shown in Table 1.

TABLE 1

| Catalyst | $A_1$ | $A_2$ | $A_3$ | $A_4$ | n-B.M. presulfiding (*) |
|---|---|---|---|---|---|
| Rate of hydro-desulfurization (%) | 91.7 | 88.7 | 86.5 | 85.1 | 84.5 |

(*) Method of presulfiding using 3% n-butyl mercaptan/KSRGO (Comparative Experiment 1)

COMPARATIVE EXPERIMENT 1

A catalyst containing 17% by weight of $MoO_3$ and 4% by weight of CoO and produced by Nippon Ketjen Co., Ltd. and marketed under product code of "KF707" was subjected to a presulfiding with a mixture of KSRGO with n-butyl mercaptan and then put to use in the reaction. The presulfiding treatment was carried out under the following conditions.
  Sulfiding oil: 3 wt % n-butyl mercaptan/KSRGO
  Amount of catalyst: 3 ml
  Liquid space velocity of feed oil: 2.0 $hr^{-1}$
  Reaction pressure: 30 $kg/cm^2$
  Reaction temperature: 316° C.
  Hydrogen/oil ratio: 300N-liters/liter
  Reaction time: 8 hrs The test of the catalyst for activity was carried out by faithfully following the procedure of Example 1.

The average of ratio of hydro-desulfurization calculated from the sulfur contents of the samples of treated oil taken at the 4th, 6th, and 8th hours along the course of reaction is shown in Table 1.

The catalysts, A and B, impregnated with mercaptoacetic acid show higher degrees of activity than the catalyst presulfided with a mixture of KSRGO with 3% by weight of n-butyl mercaptan.

EXAMPLE 2

One hundred (100) g of γ-alumina carrier (having a specific surface area of 280 $m^2/g$ and a pore volume of 0.75 ml/g) was impregnated with 80 ml of an impregnating liquid prepared from 29.0 g of molybdenum trioxide, 10.5 g of nickel carbonate having a Ni content of 43.3% by weight), 16.5 g of 85% phosphoric acid, and water. The resultant impregnated carrier was dried at 110° C. for 16 hours. Then, the dried carrier was wholly impregnated in one test run with 20.3 g of mercaptoacetic acid (d=1.33) or in the other test run with 22 ml of an alcohol solution containing 23.6 g of methyl mercaptoacetate and then dried at 110° C. for 16 hours, to obtain Catalyst $B_1$.

The metal contents of the catalyst $B_1$, were 20% by weight of molybdenum as $MoO_3$, 4% by weight of nickel as NiO, and 7% by weight of phosphorus as $P_2O_5$. The amounts of mercaptoacetic acid and methyl mercaptoacetate used in the catalysts were 1.5 times the theoretical amount of sulfur required for conversion of Mo and Ni into $MoS_2$ and NiS respectively.

Similarly, 100 g of the same carrier as mentioned above was impregnated with 80 ml of an impregnating liquid prepared from 27.4 g or 26.7 g of molybdenum trioxide, 10.0 g or 9.7 g of nickel carbonate, 6.5 g of 2.2 g of phosphoric acid, and water and dried at 110° C. for 16 hours. Then, 40 g of the dried carrier was wholly impregnated with 20.8 g or 21.3 g of mercaptoacetic acid and dried at 100° C. for 16 hours, to obtain Catalysts $B_2$ and $B_3$.

The metal contents of the catalysts, $B_2$ and $B_3$, were 20% by weight of molybdenum as $MoO_3$, 4% by weight of nickel as NiO, and 3% by weight or 1% by weight of phosphorus as $P_2O_5$. The amounts of mercaptoacetic acid deposited on the catalysts were invariably 1.5 times the theoretical amount of sulfur required for conversion of Mo and Ni into $MoS_2$ and NiS respectively.

Fifty (50) g of γ-alumina carrier (having a specific surface area of 280 $m^2/g$ and a pore volume of 0.67 ml/g) was impregnated with an impregnating liquid prepared from 12.5 g of molybdenum trioxide, 4.5 g of cobalt carbonate (having a Co content of 49.1% by weight), 6.8 g of 85% phosphoric acid, and water and then dried at 110° C. for 16 hours. Then, the dried carrier was wholly impregnated with 34.3 g of mercaptoacetic acid and then dried at 100° C. for 16 hours, to obtain a catalyst, $B_4$.

The metal contents of the catalyst $B_4$ were 18% by weight of molybdenum as $MoO_3$, 4% by weight of cobalt as CoO, and 6% by weight of phosphorus as $P_2O_5$. The amount of mercaptoacetic acid used in the catalyst was 1.5 times the theoretical amount of sulfur required for conversion of Mo and Co into $McS_2$ and CoO respectively.

Similarly, 50 g of the same carrier as mentioned above was impregnated with an impregnating liquid prepared from 12.0 g or 11.7 g of molybdenum trioxide, 4.3 g or 4.2 g of cobalt carbonate, 3.3 g or 1.1 g of phosphoric acid, and water, dried at 110° C. for 16 hours, then wholly impregnated with 32.9 g or 32.0 g of mercaptoacetic acid, and dried at 100° C. for 16 hours, to obtain Catalysts, $B_5$ and $B_6$.

The metal contents of the catalysts, $B_5$ and $B_6$ were 18% by weight of molybdenum as $MoO_3$, 4% by weight of cobalt as CoO, and 3% by weight and 1% by weight of phosphorus as $P_2O_5$. The amounts of mercaptoacetic acid used in the catalysts were invariably 1.5 times the theoretical amount of sulfur required for conversion of Mo and Co into $MoS_2$ and CoS respectively.

Fifty (50) g of the same alumina carrier as mentioned above was wholly impregnated with 47 ml of an impregnating liquid (pH 5.5) prepared from 14.5 g of molybdenum trioxide, 5.3 g of nickel carbonate, 8.2 g of phosphoric acid, 32.9 g of methyl mercaptoacetate, and water and dried at 100° C. for 16 hours, to obtain a catalyst, $B_7$.

The metal contents of the catalyst B₇ were 20% by weight of molybdenum as MoO₃, 4% by weight of nickel as NiO, and 7% by weight of phosphorus as P₂O₅. The amount of methyl mercaptoacetate used in the catalyst was 1.1 times the theoretical amount of sulfur required for conversion of Mo and Ni into MoS₂ and NiS respectively.

The catalysts, B₁, B₂, B₃, B₄, B₅, B₆ and B₇ prepared as described above were each used in effecting the reaction of hydro-desulfurization of KSRGO under the same conditions as in Example 1. The averages of rate of hydro-desulfurization are shown in Table 2 and Table 3.

COMPARATIVE EXPERIMENT 2

The same MoO₃/NiO/P₂O₅ type catalyst as used in Example 2 and having neither mercaptoacetic acid nor methyl mercaptoacetate yet impregnated thereon was subjected to the same treatment of presulfiding as in Comparative Experiment 1 and immediately put to use for the same reaction of hydro-desulfurization of KSRGO as in Example 1. The average rate of hydroodesulfurization is shown in Table 2.

TABLE 2

| Catalyst | (Mo/Ni/P type catalst) | | | |
|---|---|---|---|---|
| | B₁ | B₂ | B₃ | B₇ |
| Amount of P₂O₅ loaded (% by weight) | 7 | 3 | 1 | 7 |
| Rate of hydro-desulfurization (%) | 95.9 | 95.0 | 93.9 | 79.1 |
| Rate of hydro-desulfurization (%) in n-BM presulfiding | 73.5 | 76.5 | 81.2 | — |

TABLE 3

| Catalyst | (Mo/Co/P type catalyst) | | |
|---|---|---|---|
| | B₄ | B₅ | B₆ |
| Amount of P O loaded (% by weight)⁽¹⁾ | 6 | 3 | 1 |
| Rate of hydro-desulfurization (%) | 92.8 | 93.6 | 92.5 |

The catalysts, B₁, B, B₂, and B₃, and B₄, produced by the impregnation with mercaptoacetic acid or methyl mercaptoacetate exhibit higher degrees of activity than the catalysts presulfided with a mixture of KSRGO with 3% by weight of n-butyl mercaptan.

The Mo/Ni P type catalysts show a trend toward gaining in activity in proportion as the amount of phosphorus loaded increases. In all the catalysts of this type, that which has phosphorus loaded in an amount of 7% by weight as P₂O₅ proves to be most desirable.

In all the Mo/Co/P type catalysts, that which has phosphorus loaded in an amount of 3% by weight as P₂O₅ is found to exhibit the highest ratio of hydro-desulfurization.

EXAMPLE 3

Fifty (50) g of the same γ-alumina carrier (having a specific surface area of 320 m²/g and a pore volume of 0.72 ml/g) as used in Example 1 was impregnated with 40 ml of an impregnating liquid (pH 8) prepared from 10.8 g of molybdenum trioxide, 4.1 g of cobalt carbonate (having a Co content of 49.1% by weight), ammonia gas, and water. The impregnated carrier was then dried at 110° C. for 16 hours. Then, the dried impregnated carrier was impregnated wholly with 30 ml of an alcohol solution containing 25.3 g of 2-aminoethanethiol and then dried at 110° C. for 16 hours, to obtain a catalyst, C₁.

The metal contents of the catalyst, C₁, were 17% by weight of molybdenum as MoO₃ and 4% by weight of cobalt as CoO. The amount of 2-aminoethanethiol used in the catalyst was 1.8 times the theoretical amount of sulfur requir-d for conversion of Mo and Co to MoS₂ and CoS respectively.

Fifty (50) g of the same alumina carrier as mentioned above was impregnated wholly with 50 ml of an impregnating liquid (pH 5) prepared from 10.8 g of molybdenum trioxide, 4.1 g of cobalt carbonate, 18.3 g of 2-aminoethanethiol, ammonia gas, and water. The impregnated carrier was dried at 110° C. for 16 hours, to obtain a catalyst, C₂.

The metal contents of the catalyst, C₂, were 17% by weight of molybdenum as MoO₃ and 4% by weight of cobalt as CoO. The amount of 2-aminoethanethiol used in the catalyst was 1.3 times the theoretical amount of sulfur required for conversion of Mo and Co into MoS₂ and CoS respectively.

The catalysts, C₁ and C₂, prepared as described above were each used in effecting the reaction of hydro-desulfurization of KSRGO under the same conditions as in Example 1.

The averages of rate of hydro-desulfurization are shown in Table 4.

COMPARATIVE EXPERIMENT 3

The same catalyst as used in Example 3 and having no 2-aminoethanethiol yet impregnated thereon was subjected to the same presulfiding treatment as in Comparative Experiment 1 and was immediately used in effecting the reaction of hydro-desulfurization of KSRGO in the same manner as in Example 1. The average of rate of hydro-desulfurization is shown in Table 4.

TABLE 4

| Catalysts | C₁ | C₂ | n-B.M. presulfiding (*) |
|---|---|---|---|
| Rate of hydro-desulfurization (%) | 87.8 | 84.6 | 84.5 |

(*) Comparative Experiment 3

The catalysts, C₁ and C₂, produced by the impregnation with 2-aminoethanethiol exhibit higher degrees of activity than the catalysts presulfided using a mixture of KSRGO with 3% by weight of n-butyl mercaptan.

EXAMPLE 4

One hundred (100) g of the same γ-alumina carrier (having a specific surface area of 280 m²/g and a pore volume of 0.75 ml/g) as used in Example 2 was impregnated with 80 ml of an impregnating liquid prepared from 29.0 g of molybdenum trioxide, 10.5 g of nickel carbonate (having a Ni content of 43.3%), 16.5 g of 85% phosphoric acid, and water. The impregnated carrier was dried at 110° C. for 16 hours. Then, 40 g of the dried impregnated carrier was impregnated wholly with 22 ml of an alcohol solution containing 17.2 g of 2-aminoethanethiol and then dried at 100° C. for 16 hours, to obtain a catalyst, D₁.

The metal contents of the catalyst, D₁, were 20% by weight of molybdenum as MoO₃, 4% by weight of nickel as NiO, and 7% by weight of phosphorus as P₂O₅. The amount of 2-aminoethanethiol used in the catalyst was 1.5 times the theoretical amount of sulfur required for conversion of Mo and Ni into MoS₂ and NiS respectively.

Fifty (50) g of the same alumina carrier as mentioned above was impregnated wholly with 47 ml of an impregnating liquid (pH 5) prepared from 14.5 g of molybdenum trioxide, 5.3 g of nickel carbonate, 8.2 g of phosphoric acid, 23.9 g of 2-aminoethanethiol, and water and then dried at 110° C. for 16 hours, to obtain a catalyst, $D_2$.

The metal contents of the catalyst, $D_2$, were 20% by weight of molybdenum as $MoO_3$, 4% by weight of nickel as NiO, and 7% by weight of phosphorus as $P_2O_5$. The amount of 2-aminoethanethiol used in the catalyst was 1.1 times the theoretical amount of sulfur required for conversion of Mo and Ni into $MoS_2$ and NiS respectively.

The catalysts, $D_1$ and $D_2$, were each used in effecting the reaction of hydro-desulfurization of KSRGO in the same manner as in Example 1. The averages of rate of hydro-desulfurization are shown in Table 5.

COMPARATIVE EXPERIMENT 4

The same catalyst as used in Example 4 and having no aminoethanethiol yet impregnated was calcined at 500° C. for two hours, subjected to the same presulfiding treatment as in Comparative Experiment 1, and immediately put to use in effecting the reaction of hydro-desulfurization in the same manner as in Example 1. The average of rate of hydro-desulfurization is shown in Table 5.

The catalysts, $D_1$ and $D_2$, produced by the impregnation with 2-aminoethanethiol exhibit higher degrees of activity than the catalysts presulfided with a mixture of KSRGO with 35 by weight of n-butyl mercaptan.

TABLE 5

| Catalyst | $D_1$ | $D_2$ | n-B.M. presulfiding (*) |
|---|---|---|---|
| Rate of hydro-desulfurization (%) | 85.2 | 82.1 | 73.5 |

(*) Comparative Experiment 4

EXAMPLE 5

Fifty (50) g of a γ-alumina carrier having a specific surface area of 320 m²/g and a pore volume of 0.72 ml/g was impregnated with 40 ml of an impregnating liquid (pH 8) prepared from 10.8 g of molybdenum trioxide, 4.1 g of cobalt carbonate (having a Co content of 49.1% by weight), ammonia gas, and water and then dried at 110° C. for 16 hours. Then, the dried impregnated carrier was impregnated wholly with 30 ml of an alcohol solution containing 15.5 g of ethane dithiol (d=1.12) and then dried at 110° C. for 16 hours, to obtain a catalyst, $E_1$.

The metal contents of the catalyst, $E_1$, were 17% by weight of molybdenum as $MoO_3$ and 4% by weight of cobalt as CoO. The amount of ethanedithiol used in the catalyst was 1.8 times the theoretical amount of sulfur required for conversion of Mo and Co into $MoS_2$ and CoS respectively.

Fifty (50) g of the same alumina carrier as mentioned above was impregnated wholly with 50 ml of an impregnating liquid (pH 5) prepared from 10.8 g of molybdenum trioxide, 4.1 g of cobalt carbonate, 11.2 g of ethane dithiol, ammonia gas, and water and then dried at 110° C. for 16 hours, to obtain a catalyst, $E_2$.

The metal contents of the catalyst, $E_2$, were 17% by weight of molybdenum as $MoO_3$ and 4% by weight of cobalt as CoO. The amount of ethane dithiol used in the catalyst was 1.3 times the theoretical amount of sulfur requried for conversion of Mo and Co into $MoS_2$ and CoS respectively.

The catalysts, $E_1$ and $E_2$, prepared as described above were each used in effecting the reaction of hydro-desulfurization of KSRGO in the same manner as in Example 1. The averages of rate of hydro-desulfurization are shown in Table 6.

COMPARATIVE EXPERIMENT 5

The same catalyst as used in Example 5 and having no ethane dithiol yet impregnated was subjected to the same presulfiding treatment as in Comparative Experiment 1 and immediately put to use in effecting the reaction of hydro-desulfurization of KSRGO in the same manner as in Example 1. The average of rate of hydro-desulfurization is shown in Table 6.

TABLE 6

| Cataylst | $E_1$ | $E_2$ | n-B.M. presulfiding (*) |
|---|---|---|---|
| Rate of hydro-desulfurization (%) | 90.8 | 86.0 | 84.5 |

(*) Comparative Experiment 5

The catalysts, $E_1$ and $E_2$, produced by the impregnation with ethane dithiol exhibit higher degrees of activity than the catalysts presulfided with a mixture of KSRGO with 3% by weight of n-butyl mercaptan.

EXAMPLE 6

One hundred (100) g of the same γ-alumina carrier (having a specific surface area of 280 m²/g and a pore volume of 0.75 ml/g) as used in Example 2 was impregnated with 80 ml of an impregnating liquid prepared from 29.0 g of molybdenum trioxide, 10.5 g of nickel carbonate (having a Ni content of 43.3% by weight), 16.5 g of 85% phosphoric acid, and water and then dried at 110° C. for 16 hours. Then, 40 g of the dried impregnated carrier was impregnated wholly with 22 ml of an alcohol solution containing 10.5 g of ethane dithiol and then dried at 100° C. for 16 hours, to obtain a catalyst, $F_1$.

The metal contents of the catalyst, $F_1$, were 20% by weight of molybdenum as $MoO_3$, 4% by weight of nickel as NiO, and 7% by weight of phosphorus as $P_2O_5$. The amount of ethane dithiol used in the catalyst was 1.5 times the theoretical amount of sulfur required for conversion of Mo and Ni into $MoS_2$ and NiS respectively.

Fifty (50) g of the same alumina carrier as mentioned above was impregnated wholly with 47 mol of an impregnating liquid (pH 5) prepared from 14.5 g of molybdenum trioxide, 5.3 g of nickel carbonate, 8.2 g of phosphoric acid, 14.5 g of ethane dithiol, and water and then dried at 100° C. for 16 hours to obtain a catalyst, $F_2$.

The metal contents of the catalyst, $F_2$, were 20% by weight of molybdenum as $MoO_3$, 4% by weight of nickel as NiO, and 7% by weight of phosphorus as $F_2O_5$. The amount of ethane dithiol used in the catalyst was 1.1 times the theoretical amount of sulfur required for conversion of Mo and Ni into $MoS_2$ and NiS respectively.

The catalysts, $F_1$ and $F_2$, prepared as described above were each used in effecting the reaction of hydro-desulfuization of KSRGO in the same manner as in Example 1. The averages of rate of hydro-desulfurization are shown in Table 7.

COMPARATIVE EXPERIMENT 6

The same catalyst as used in Example 6 and having no ethane dithiol yet impregnated thereon was calcined at 500° C. for two hours, subjected to the same presulfiding treatment as in Comparative Experiment 1, and immediately put to use in effecting the reaction of hydro-desulfurization of KSRGO in the same manner as in Example 1. The average of rate of hydrodesulfurization is shown in Table 7.

The catalysts, $F_1$ and $F_2$, produced by the impregnation with ethane dithiol exhibit higher degrees of activity than the catalysts presulfided using a mixture of KSRGO with 3% by weight of n-butyl mercaptan.

TABLE 7

| Catalyst | $F_1$ | $F_2$ | n-B.M. presulfiding (*) |
|---|---|---|---|
| Rate of hydro-desulfurization (%) | 96.5 | 91.4 | 73.5 |

(*) Comparative Experiment 6

EXAMPLE 7

Fifty (50) g of the same γ-alumina carrier (having a specific surface area of 320 m²/g and a pore volume of 0.72 ml/g) as used in Example 1 was impregnated with 40 ml of an impregnating liquid (pH 8) prepared from 10.8 g of molybdenum trioxide, 4.1 g of cobalt carbonate (having a Co content of 49.1% by weight), ammonia gas, and water and then dried at 110° C. for 16 hours. Then, the dried impregnated carrier was impregnated wholly with 30 ml of an alcohol solution containing 25.5 g of thioacetic acid (d=1.07) and dried at 110° C. for 16 hours, to obtain a catalyst, $G_1$.

The metal contents of the catalyst, $G_1$, were 17% by weight of molybdenum as $MoO_3$ and 4% of cobalt as CoO. The amount of thioacetic acid used in the catalyst was 1.8 times the theoretical amount of sulfur required for conversion of Mo and Co into $MoS_2$ and CoS respectively.

Fifty (50) g of the same alumina carrier as mentioned above was impregnated wholly with 50 ml of an impregnating liquid (pH 5) prepared from 10.8 g of molybdenum trioxide, 4.1 g of cobalt carbonate, 18.4 g of thioacetic acid, ammonia gas, and water and dried at 110° C. for 16 hours, to obtain a catalyst, $G_2$.

The metal contents of the catalyst, $G_2$, were 17% by weight of molybdenum as $MoO_3$ and 4% by weight of cobalt as CoO. The amount of thioacetic acid used in the catalyst was 1.3 times the theoretical amount of sulfur required for conversion of Mo and Co into $MoS_2$ and CoS respectively.

The catalysts, $G_1$ and $G_2$, prepared as described above were each used in effecting the reaction of hydrodesulfurization of KSRGO in the same manner as in Example 1. The averages of rate of hydro-desulfurization are shown in Table 8.

COMPARATIVE EXPERIMENT 7

The same catalyst as used in Example 7 and having no thioacetic acid yet impregnated thereto was subjected to the same presulfiding treatment as in Comparative Experiment 1 and immediately put to use in effecting the reaction of hydro-desulfurization of KSRGO in the same manner as in Example 1. The average rate of hydro-desulfurization is shown in Table 8.

The catalysts, $G_1$ and $G_2$, produced by the impregnation of thioacetic acid exhibit higher degrees of activity than the catalysts presulfided using a mixture of KSRGO with 3% by weight of n-butyl mercaptan.

TABLE 8

| Catalyst | $G_1$ | $G_2$ | n-B.M. presulfiding (*) |
|---|---|---|---|
| Rate of hydro-desulfurization (%) | 90.5 | 86.1 | 84.5 |

(*) Comparative Experiment 7

EXAMPLE 8

One hundred (100) g of the same γ-alumina carrier (having a specific surface area of 280 m²/g and a pore volume of 0.75 ml/g) as used in Example 2 was impregnated with 80 ml of an impregnating liquid prepared from 16.5 g of molybdenum trioxide, 10.5 g of nickel carbonate (having a Ni content of 43.3%), 16.5 g of 85% phosphoric acid, and water and then dried at 110° C. for 16 hours. Then, 40 g of the dried impregnated carrier was impregnated wholly with 22 ml of an alcohol solution containing 16.9 g of thioacetic acid and dried at 110° C. for 16 hours, to obtain a catalyst, $H_1$.

The metal contents of the catalyst, $H_1$, were 20% by weight of molybdenum as $MoO_3$, 4% by weight of nickel as NiO, and 7% by weight of phosphorus as $P_2O_5$. The amount of thioacetic acid used in the catalyst was 1.5 times the theoretical amount of sulfur required for conversion of Mo and Ni into $MoS_2$ and NiS respectively.

Fifty (50) g of the same alumina carrier as mentioned above was impregnated wholly with 47 ml of an impregnating liquid (pH 5) prepared from 14.5 g of molybdenum trioxide, 5.3 g of nickel carbonate, 8.2 g of phosphoric acid, 23.6 g of thioacetic acid, and water and then dried at 100° C. for 16 hours, to obtain a catalyst, $H_2$.

The metal contents of the catalyst, $H_2$, were 20% by weight of molybdenum as $MoO_3$, 4% by weight of nickel as NiO, and 7% by weight of phosphorus as $P_2O_5$. The amount of thioacetic acid used in the catalyst was 1.1 times the theoretical amount of sulfur required for conversion of Mo and Ni into $MoS_2$ and NiS respectively.

The catalysts, $H_1$ and $H_2$, prepared as described above were each used in effecting the reaction of hydrodesulfurization of KSRGO in the same manner as in Example 1. The averages of rate of hydro-desulfurization are shown in Table 9.

COMPARATIVE EXPERIMENT 8

The same catalyst as used in Example 8 and having no thioacetic acid yet impregnated thereon was calcined at 500° C. for two hours, subjected to the same presulfiding treatment as in Comparative Experiment 1, and immediately put to use in effecting the reaction of hydro-desulfurization of KSRGO in the same manner as in Example 1. The average of rate of hydro-desulfurization is shown in Table 9.

TABLE 9

| Catalyst | $H_1$ | $H_2$ | n-B.M. presulfiding (*) |
|---|---|---|---|
| Rate of hydro-desulfurization (%) | 96.5 | 91.4 | 73.5 |

(*) Comparative Experiment 8

The catalysts, $H_1$ and $H_2$, produced by the impregnation with thioacetic acid exhibit higher degrees of activity than the catalysts presulfided using a mixture of KSRGO with 3% by weight of n-butyl mercaptan.

Thus, there is provided in accordance with the present invention a catalyst for the hydrotreatment of a hydrocarbon oil, which catalyst is produced at a heretofore unattainable small expense by a procedure simpler than the conventional procedure of presulfiding treatment and, when used for catalysis, manifests a highly desirable ability. The embodiments described above are intended to be purely illustrative, not limitative, of the invention and persons of ordinary skill in the art, therefore, are enabled to make variations and modifications thereof without departing from the spirit and of the invention. All the modifications are embraced in the scope of the claims appended hereto.

What is claimed is:

1. A method for the production of a metal sulfide catalyst for use in the hydrotreatment of hydrocarbons without the need for a calcination treatment, said method comprising the steps of (a) impregnating a carrier of an inorganic oxide with an aqueous solution containing at least one member selected from the group consisting of the water-soluble compounds of molybdenum, tungsten, and the metals of Group 8 in the Periodic Table of Elements, (b) drying the resultant impregnated carrier, (c) subsequently impregnating the dried carrier with a solution of at least one mercapto (—SH) group-containing organic compound selected from the group consisting of mercapto-carboxylic acids represented by the general formula:

HS—(CH$_2$)$_n$—COOR wherein n stands for an integer in the range of 1 to 3 and R for a hydrogen atom, an alkali metal, an alkaline earth metal, ammonium, or a linear or branched naphthenic alkyl group having 1 to 10 carbon atoms; an amino-substituted mercaptan represented by the general formula:

H$_2$N—R'—SH wherein R' stands for a divalent hydrocarbon group; divalent mercaptans represented by the general formula:

HS—R'—SH wherein R' stands for a divalent hydrocarbon group; and thio acids represented by the general formula:

R''—COSH wherein R'' stands for a monovalent hydrocarbon group; and (d) drying the impregnated carrier at a temperature up to 180° C.

2. The method according to claim 1, wherein said inorganic oxide of which said carrier is made is at least one member selected from the group consisting of alumina, silicaalumina, and titania.

3. The method according to claim 1, wherein said metal of Group 8 in the Periodic Table of elements is at least one member selected from the group consisting of cobalt and nickel.

4. The method according to claim 1, wherein said aqueous solution used to impregnate said carrier also includes phosphorus.

5. The method according to claim 1, wherein said mercaptocarboxylic acid represented by the general formula, HS—(CH$_2$)$_n$—COOR (wherein in stands for an integer in the range of 1 to 3 and R for a hydrogen atom, an alkali metal, an alkaline earth metal, ammonium, or a linear or branched naphthenic alkyl group having 1 to 10 carbon atoms) is at least one member selected from the group consisting of mercaptoacetic acid (HSCH$_2$COOH), β-mercaptopropionic acid (HSCH$_2$CH$_2$COOH), alkali metal salts, alkaline earth metal salts, and ammonium salts of said acids, methyl mercaptoacetate (HSCH$_2$COOCH$_3$), ethyl 2-mercaptoacetate (HSCH$_2$COOC$_2$H$_5$), ethylhexyl mercaptoacetate (HCSH$_2$COOC$_8$H$_{17}$), and methyl 3-mercaptopropionate (HSCH$_2$CH$_2$COOCH$_3$).

6. The method according to claim 1, wherein said amino-substituted mercaptan represented by the general formula, H$_2$N—R'—SH (wherein R' stands for a divalent hydrocarbon group), is at least one member selected from the group consisting of 2-aminoethanethiol (H$_2$NCH$_2$CH$_2$SH) and 4-aminothiophenol (H$_2$NC$_6$H$_4$SH).

7. The method according to claim 1, wherein said divalent mercaptan represented by the general formula, HS—R'—SH (wherein R' stands for a divalent hydrocarbon group) is at least one member selected from the group consisting of ethanedithiol (HSCH$_2$CH$_2$SH) and 1,4-butandithiol (SH(CH$_2$)$_4$SH).

8. The method according to claim 1, wherein said thio acids represented by the general formula, R''—COSH (R'' stands for a monovalent hydrocarbon group), are at least one member selected from the group consisting of thioacetic acid (CH$_3$COSH) and thiobenzoic acid (C$_6$H$_5$COSH).

9. The method according to claim 1, wherein the mercapto group-containing organic compound used in an amount in the range of 1 to 3 times the equivalent weight of sulfur required for molybdenum, tungsten, or a metal of Group 8 in the Periodic Table of Elements to form a sulfide of the type capable of exhibiting high activity in the reaction of hydrotreatment.

10. A method for the production of a metal sulfide catalyst for the hydrotreatment of a hydrocarbon without the need for a calcination treatment, said method comprising the steps of (a) impregnating a carrier of an inorganic oxide with a solution containing at least one member selected from the group consisting of the water-soluble compound of molybdenum, tungsten, and the metals of the Group 8 in the Periodic Table of Elements, and at least one mercapto (—SH) group-containing organic compound selected from the group consisting of mercapto-carboxylic acids represented by the general formula:

HS—(CH$_2$)$_n$—COOR wherein n stands for an integer in the range of 1 to 3 and R for a hydrogen atom, an alkali metal, an alkaline earth metal, ammonium, or linear or branched naphthenic alkyl group having 1 to 10 carbon atoms; an amino-substituted mercaptan represented by the general formula:

H$_2$N—R'—SH wherein R' stands for a divalent hydrocarbon group; divalent mercaptans represented by the general formula:

HS—R'—SH wherein R' stands for a divalent hydrocarbon group; and thio acids represented by the general formula:

R"—COSH wherein R" stands for a monovalent hydrocarbon group, and (b) drying the impregnated carrier at a temperature of up to 180° C.

11. The method according to claim 10, wherein said inorganic oxide of which said carrier is made is at least one member selected from the group consisting of alumina, silicaalumina, and titania.

12. The method according to claim 10, wherein said metal of Group 8 in the Periodic Table of elements is at least one member selected from the group consisting of cobalt and nickel.

13. The method according to claim 10, wherein said aqueous solution used to impregnate said carrier also includes phosphorus.

14. The method according to claim 10, wherein said mercaptocarboxylic acid represented by the general formula, HS—$(CH_2)_n$—COOR (wherein n stands for an integer in the range of 1 to 3 and R for a hydrogen atom, an alkali metal, an alkaline earth metal, ammonium, or a linear or branched naphthenic alkyl group having 1 to 10 carbon atoms) is at least one member selected from the group consisting of mercaptoacetic acid ($HSCH_2COOH$), β-mercaptopropionic acid ($HSCH_2CH_2COOH$), alkali metal salts, alkaline earth metal salts, and ammonium salts of said acids, methyl mercaptoacetate ($HSCH_2COOCH_3$), ethyl 2-mercaptoacetate ($HSCH_2COOC_2H_5$), ethylhexyl mercaptoacetate ($HCSH_2COOC_8H_{17}$), and methyl 3-mercaptopropionate ($HSCH_2CH_2COOCH_3$).

15. The method according to claim 10, wherein said aminosubstituted mercaptan represented by the general formula, $H_2N$—R'—SH (wherein R' stands for a divalent hydrocarbon group), is at least one member selected from the group consisting of 2-aminoethanethiol ($H_2NCH_2CH_2SH$) and 4-aminothiophenol ($H_2NC_6SH$).

16. The method according to claim 10, wherein said divalent mercaptan represented by the general formula, HS—R'—SH (wherein R' stands for a divalent hydrocarbon group) is at least one member selected from the group consisting of ethanedithiol ($HSCH_2CH_2SH$) and 1,4-butanedithiol ($HS(CH_2)_4SH$).

17. The method according to claim 10, wherein said thio acids represented by the general formula, R"=COSH (R" stands for a monovalent hydrocarbon group), are at least one member selected from the group consisting of thioacetic acid ($CH_3COSH$) and thiobenzoic acid ($C_6H_5COSH$).

18. The method according to claim 10, wherein the mercapto group-containing organic compound is used in an amount in the range of 1 to 3 times the equivalent weight of sulfur required for molybdenum, tungsten, or a metal of Group 8 in the Periodic Table of Elements to form a sulfide of the type capable of exhibiting high activity in the reaction of hydrotreatment.

* * * * *

UNITED STATES PATENT AND TRADEMARK OFFICE
CERTIFICATE OF CORRECTION

PATENT NO. : 4,981,828
DATED : January 1, 1991
INVENTOR(S) : Yasuhito TAKAHASHI et al.

It is certified that error appears in the above-identified patent and that said Letters Patent is hereby corrected as shown below:

On the title page please insert the following:
[30]　　Foreign Application Priority Data

| | | |
|---|---|---|
| July 2, 1987 [JP] | Japan | ..........62-163,997 |
| July 2, 1987 [JP] | Japan | ..........62-163,998 |
| July 2, 1987 [JP] | Japan | ..........62-163,999 |
| July 2, 1987 [JP] | Japan | ..........62-164,000 |
| July 3, 1987 [JP] | Japan | ..........62-166,640 |

Signed and Sealed this

Twenty-fifth Day of August, 1992

*Attest:*

DOUGLAS B. COMER

*Attesting Officer*　　*Acting Commissioner of Patents and Trademarks*